Oct. 19, 1943.  J. J. McGINLEY  2,332,096
BOTTLE WRAPPING MACHINE
Filed April 1, 1939  11 Sheets-Sheet 1

INVENTOR
JAMES J. McGINLEY
ATTORNEY

Oct. 19, 1943.  J. J. McGINLEY  2,332,096
BOTTLE WRAPPING MACHINE
Filed April 1, 1939  11 Sheets-Sheet 2

INVENTOR
JAMES J. McGINLEY
BY George Hastings
ATTORNEY

Oct. 19, 1943.  J. J. McGINLEY  2,332,096
BOTTLE WRAPPING MACHINE
Filed April 1, 1939   11 Sheets-Sheet 4

INVENTOR
JAMES J. McGINLEY
BY Georges Hastings
ATTORNEY

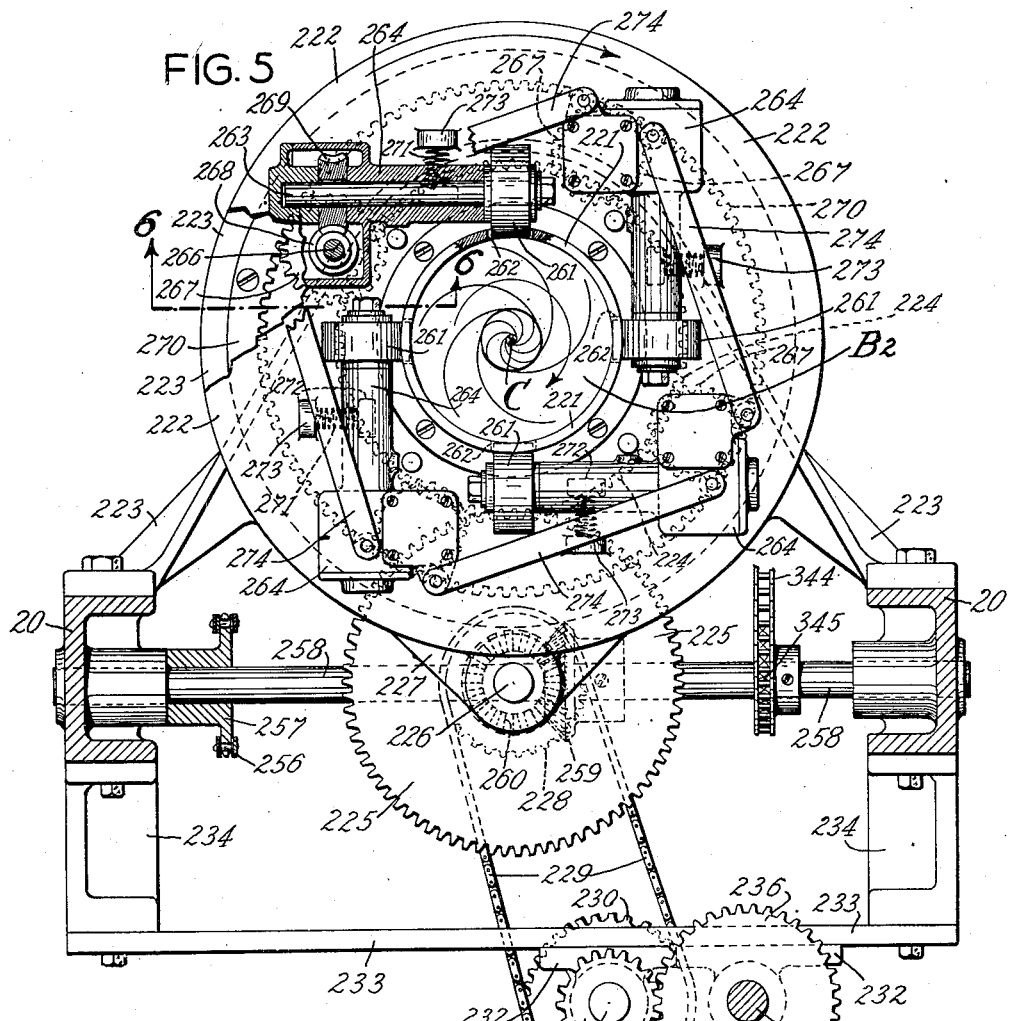
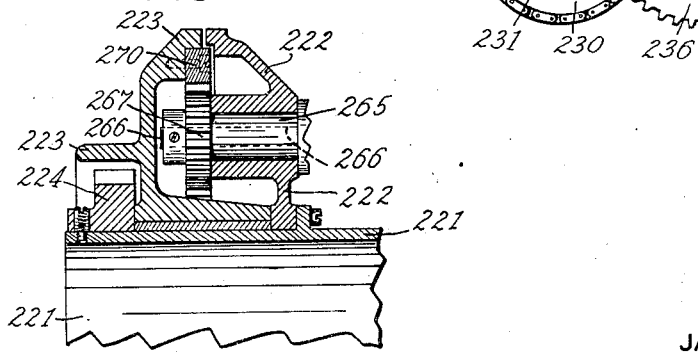

INVENTOR
JAMES J. McGINLEY
BY George S Hastings
ATTORNEY

Oct. 19, 1943.   J. J. McGINLEY   2,332,096
BOTTLE WRAPPING MACHINE
Filed April 1, 1939   11 Sheets-Sheet 7
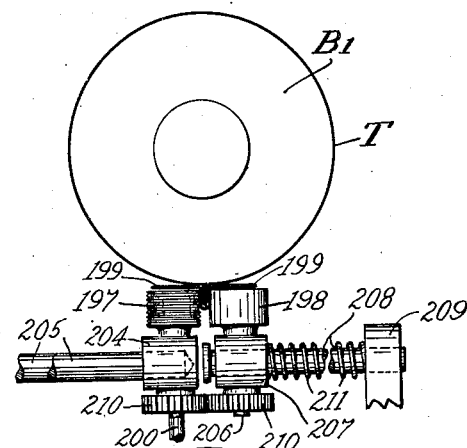
FIG. 13
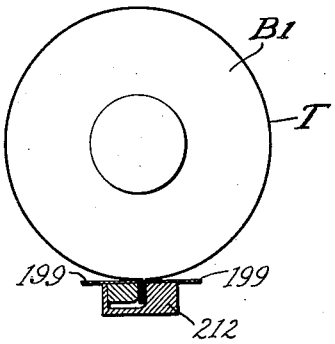
FIG. 14
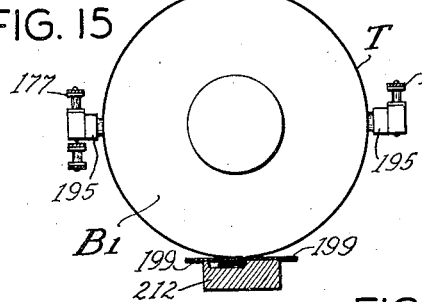
FIG. 15
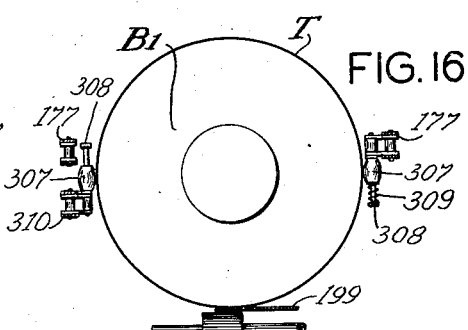
FIG. 16
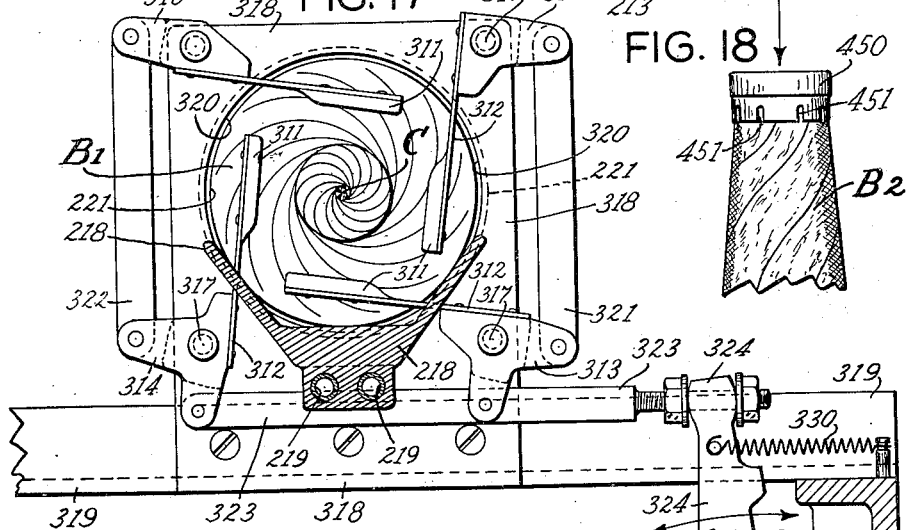
FIG. 17
FIG. 18
INVENTOR
JAMES J. McGINLEY
BY  *George Hastings*
ATTORNEY Oct. 19, 1943.  J. J. McGINLEY  2,332,096
BOTTLE WRAPPING MACHINE
Filed April 1, 1939   11 Sheets-Sheet 8

INVENTOR
JAMES J. McGINLEY
BY George S Hastings
ATTORNEY

Oct. 19, 1943.   J. J. McGINLEY   2,332,096
BOTTLE WRAPPING MACHINE
Filed April 1, 1939   11 Sheets-Sheet 9

INVENTOR
JAMES J. McGINLEY
BY George S. Hastings
ATTORNEY

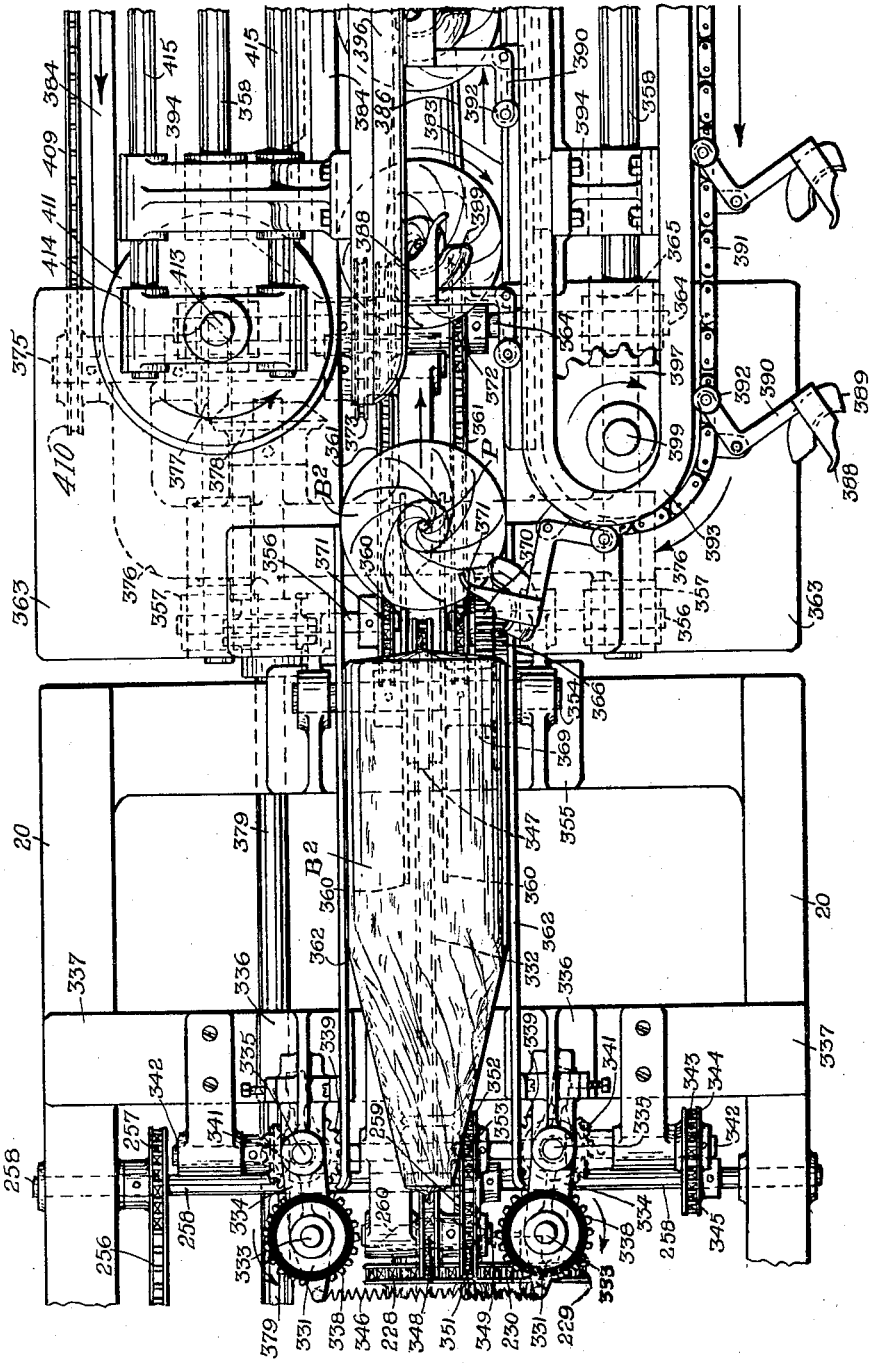

Patented Oct. 19, 1943

2,332,096

UNITED STATES PATENT OFFICE 2,332,096

BOTTLE WRAPPING MACHINE

James J. McGinley, East Williston, N. Y., assignor to American Machine and Foundry Company, a corporation of New Jersey Application April 1, 1939, Serial No. 265,435

24 Claims. (Cl. 93—3)

This invention relates to bottle wrapping machines, especially such to wrap round bottles in Cellophane, Glassine, waxed paper, or other suitable heat sealing wrapping material, or tissue, or any other kind of suitable paper.

The main object of this invention is to wrap said bottles by surrounding them with a continuous tube of suitable material, to twist said tube between said bottles, and to separate them by cutting said twisted portion.

Another object of this invention lies in the unique method of feeding said bottle into the machine in upright position, then tilting the same while passing through the wrapping process and ejecting the completely wrapped bottle in the original upright position.

With these and other objects not specifically mentioned in view, the invention consists in certain combinations and constructions which will be hereinafter fully described, and then specifically set forth in the claims hereunto appended.

In the accompanying drawings which form a part of this specification, and in which like characters of reference indicate the same or like parts:

Fig. 5 is a sectional front elevation of the machine, taken on line 5—5 of Fig. 2, illustrating the tube twisting mechanism;

Fig. 6 is a sectional portion of the twister head, taken on line 6—6 of Fig. 5;

Figs. 8 to 16 are sectional end elevations illustrating the successive steps of the tube and lock seam forming mechanism; and Fig. 17 is a sectional front elevation illustrating the bottle neck portion pre-forming jaws; and Fig. 18 shows a wrapped and capped bottle.

Figure 1:
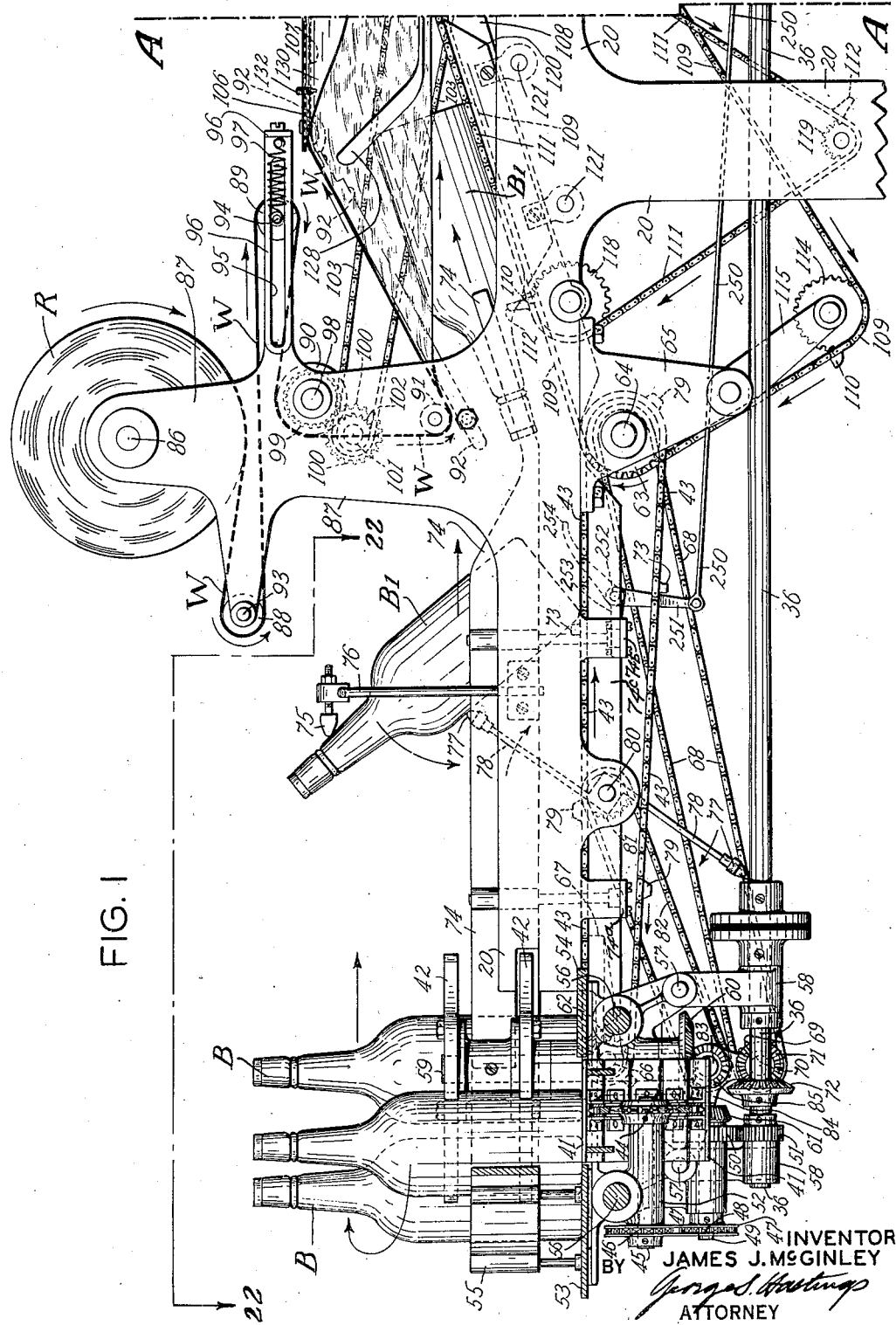
Figs. 1, 2 and 3 are partial side elevations which when joined on line A—A and B—B constitute a complete side elevation of the bottle wrapping machine.
Figure 4:
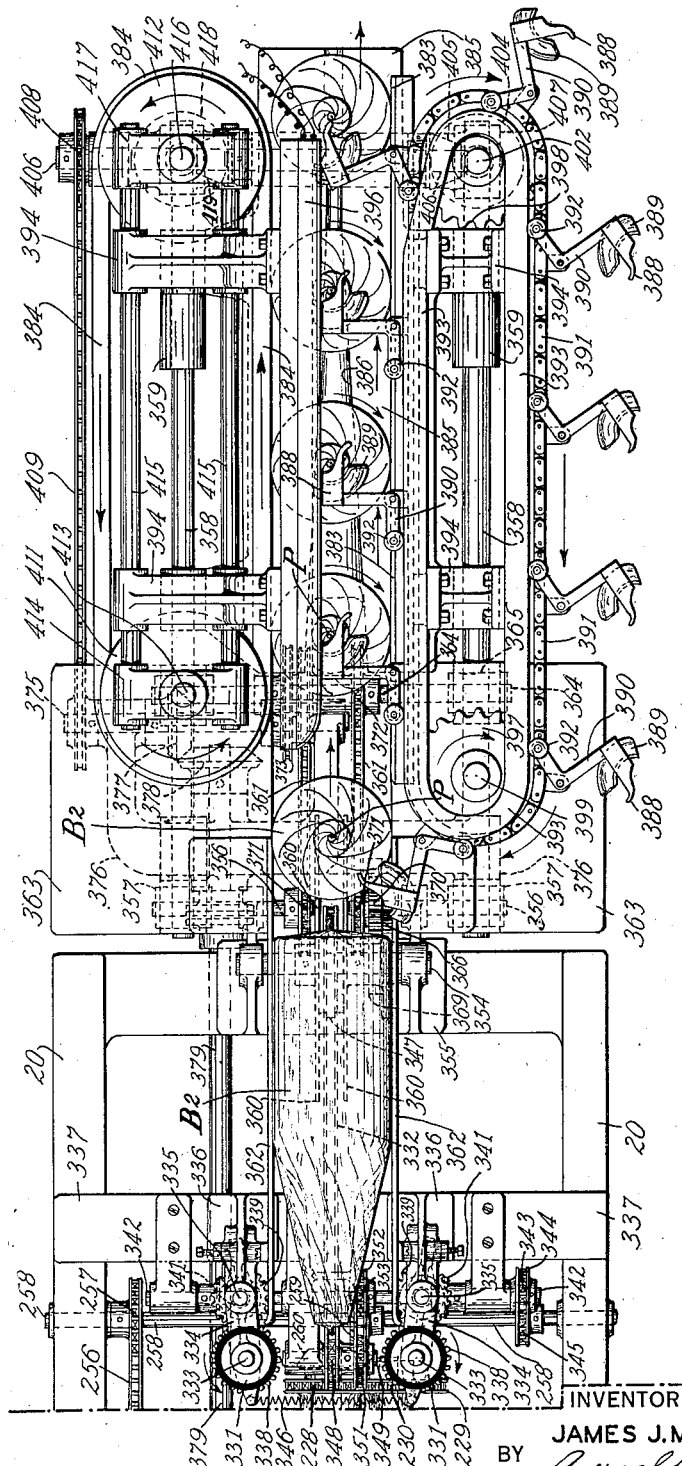
Fig. 4 is a plan view of the delivery end of the machine, taken on line 4—4 of Fig. 3.
Figure 21:
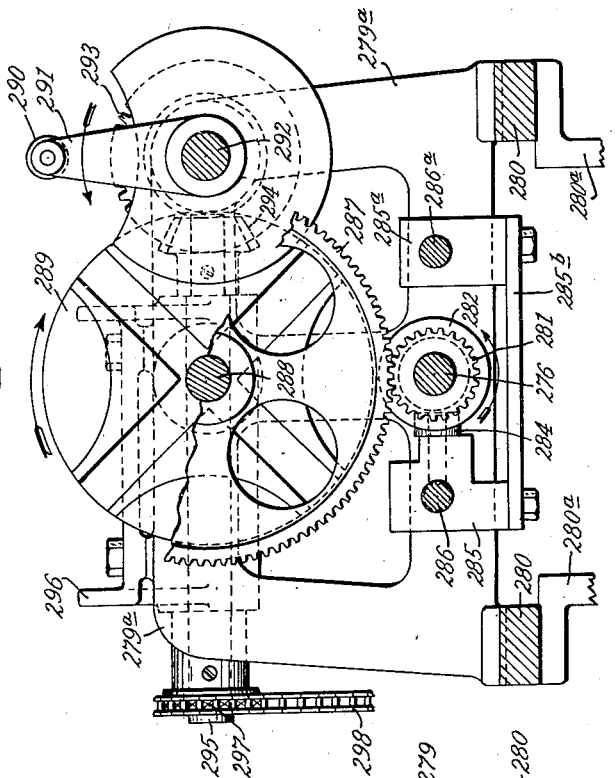
Figure 20:
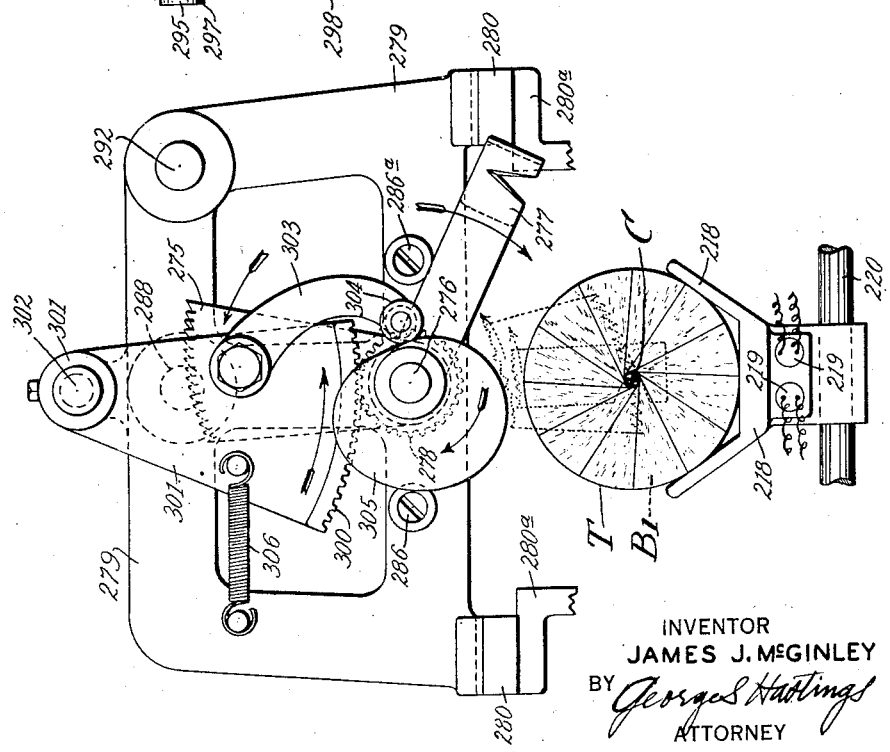
Figure 22:
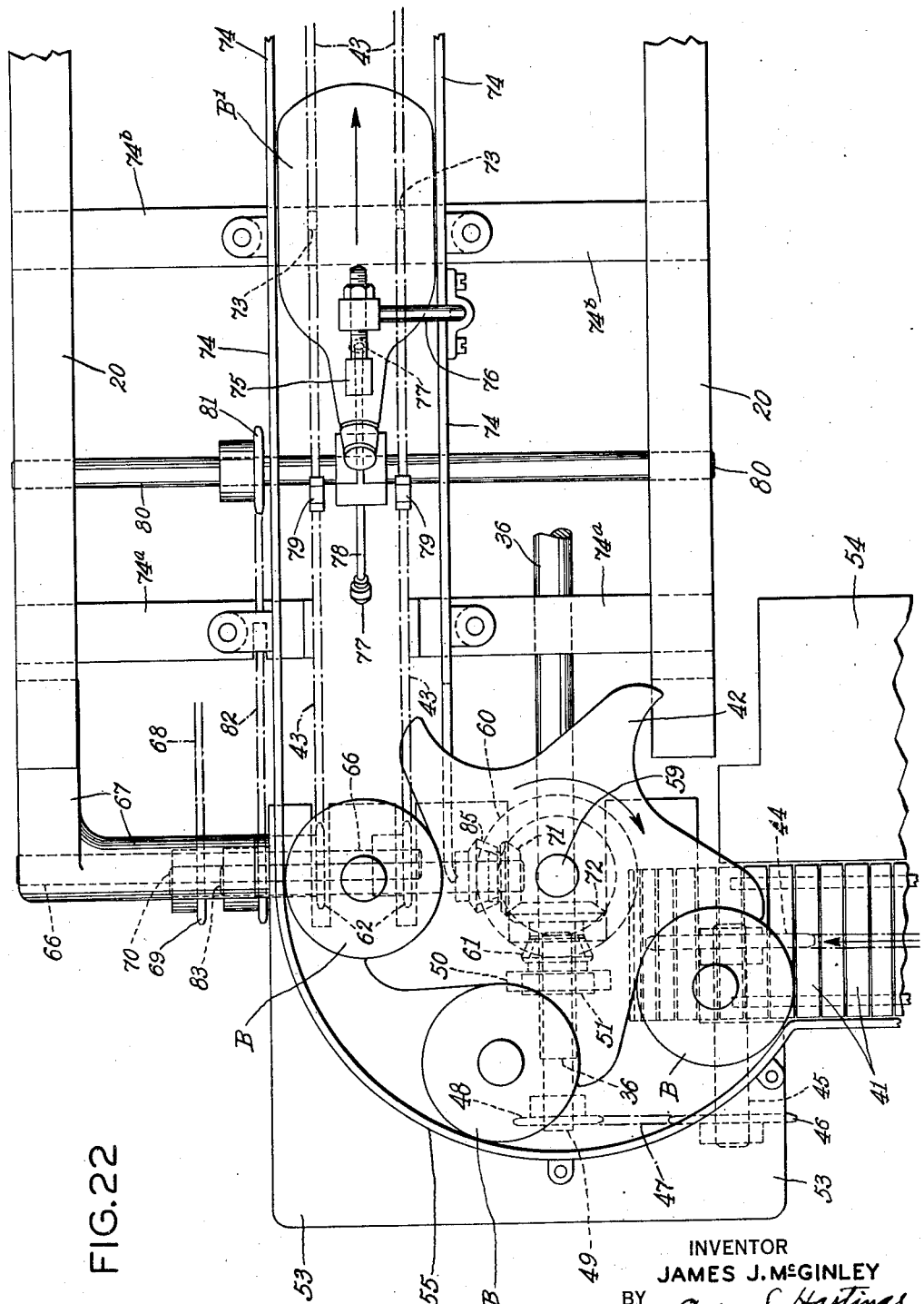
Figure 19:
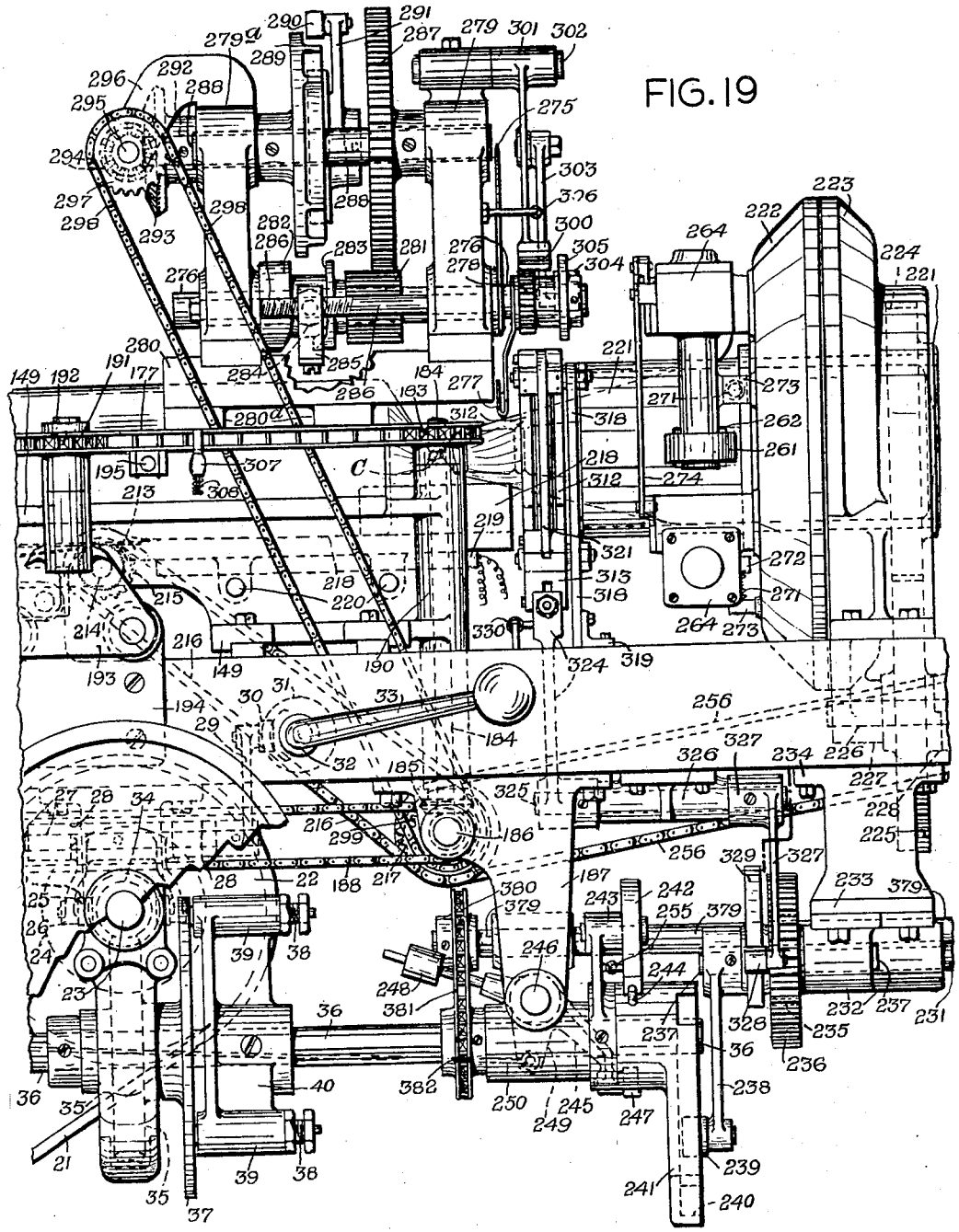
Fig. 19 is an enlarged side elevation of a portion of the machine showing the twisting and cut-off devices.

Figs. 20 and 21 are sectional end elevations of the cut-off device, taken on lines 20—20 and 21—21 of Fig. 19;

Fig. 22 is a partial plan view on an enlarged scale taken on line 22—22 of Fig. 1, showing the bottle upsetting device and the star wheel portion of the bottle feed, the trip lever and linkage controlled therefrom being omitted;

Fig. 23 is a portion of the plan view shown in Fig. 4 on an enlarged scale showing a portion of the delivery end of the machine.

The entire machine is supported by means of a frame 20 and is driven from a motor, not shown, by a V-belt 21 (Fig. 2) driving a pulley 22 loosely mounted on a shaft 23 supported by suitable bearings attached to frame 20. To pulley 22 is fastened the female member of a suitable standard friction clutch 24 whose male member is attached to shaft 23. Engaging with an annular recess in the hub of the female member of said clutch 24 are a pair of rollers 25 attached to a forked lever 26 mounted on a shaft 27 supported by suitable bearings 28 held by the main frame 20. To shaft 27 is also attached a lever 29 carrying a roller 30 riding against a cam disk 31 fastened to a shaft 32 on whose protruding end is mounted a hand lever 33. The manipulation of the latter causes said clutch 25 to engage or disengage, thus starting or stopping the entire machine.

To shaft 25 is fastened a worm 34 engaging with a worm wheel 35 loosely mounted on the main drive shaft 36 supported by suitable bearing brackets secured to the main frame 20. Worm wheel 35 is equipped with a disk 37 provided with a number of suitable recesses with each of which engages a spring-pressed plunger 38. Said plungers are supported in hubs 39 of a driving cross 40 fastened on the main drive shaft 36. The exemplified method of transmitting the power to the main shaft is selected for the purpose of preventing any breakage of glass bottles in case the latter should, at one point or another, jam in the machine. For the convenience of the operator, shaft 23 is also equipped with a hand wheel 23a.

The bottles B to be wrapped, are fed by a conveyor chain 41 (Fig. 1) extending transversely of the machine into a star wheel 42 which transfers said bottles at proper intervals onto a pair of conveyor chains 43. Conveyor chain 41 runs over and is driven by a sprocket 44 mounted on a shaft 45 carrying a sprocket 46 driven by means of chain 47 from a sprocket 48 mounted on a shaft 49 to which is secured a gear 50 meshing with a gear 51 keyed to the main drive shaft 36. Shafts 45 and 49 are supported by bearings of a supporting bracket 52 which also carries a pair of suitable stationary plates 53 and 54. On plate 53 is mounted an arcuate guide rail 55 engaging the bottles advanced by said star wheel. Bracket 52 is held by a pair of supporting rods 56 suitably attached to a pedestal (not shown). Bracket 52 furthermore carries a pair of studs 57 to each of which is fastened a bearing lug 58 supporting the main drive shaft 36 at this end of the machine.

Star wheel 42 is mounted on a vertical shaft 59 supported by bracket 52 and driven by a bevel gear 60 meshing with a bevel gear 61 mounted on shaft 49. The feed conveyor chains 43 are supported by a pair of idler sprockets 62 and driven by a pair of sprockets 63 mounted on a shaft 64 supported by a pair of bearing brackets 65 attached to the main frame 20. Sprockets 62 are mounted on shaft 66 supported in a bearing lug 67 on the main frame 20. Shaft 64 is driven by a suitable sprocket secured thereon, over which runs a chain 68 which in turn is driven from a sprocket 69 mounted on a shaft 70. The latter carries a bevel gear 71 meshing with a bevel gear 72 which is secured to the main drive shaft 36. The bottles B delivered by the star wheel 42 onto the conveyor chain 43 are advanced by successive transporting lugs 73 secured to said conveyor chain and are guided by a pair of side guide rails 74 attached to cross-bars 74a and 74b. The cross-bars 74a have vertical flanges fastened to the sides of bars 74c underlying and supporting the upper runs of the conveyor chains 43, the bars 74c being also supported by cross bar 74b. The bottles are conveyed in an upright position, standing on said conveyor chain 43 until the neck of the bottle contacts a rubber bumper 75 adjustably mounted on a rod 76 secured to side guide rails 74. While the neck of the bottle is stopped by the stationary rubber bumper 75, the lower end of said bottle is further advanced by the transporting lug 73 of the continuously moving conveyor chain, thus causing said bottle to tip over to a horizontal position. In order to let the bottle down gently to avoid cracking of or injury to the same, either of two rubber tips 77 mounted on each end of revolving arm 78 engages said bottle at the start of the tilting and supports the same during the tilting period until the upper portion of said bottle comes to a rest on a pair of rubber cushions 79 secured to said conveyor chain 43. Arm 78 is equipped on both ends with rubber tips 77 and rotates continuously in properly timed relation with conveyor chain 43 in the clockwise direction indicated by arrows in Fig. 1. The hub of said arm is mounted on a shaft 80 supported by bearing lugs of main frame 20. Shaft 80 carries a sprocket 81 which is driven by a chain 82 from a suitable sprocket secured to a shaft 83 supported by a bearing bracket 84 held by studs 57. Shaft 83 is driven by a bevel gear 85 meshing with the bevel gear 60 which is the same gear driving star wheel 42.

The wrapping material, which may be heat sealable material, such as Cellophane or wax paper or the like, or uncoated material, is fed from a reel R which is mounted on a shaft 86 supported in suitable bearings of a pair of vertical webs 87 of the main frame 20. The wrapping material is guided from the reel R in the form of a web W over an idler roller 88, a take-up roller 89, a feed roller 90 and a guide roller 91 onto a triangular frame 92. Idler roller 88 is pivoted on a shaft 93 held by suitable lugs of arms 87.

The take-up roller 89 is mounted on a shaft 94, each end of which is supported and guided by horizontal slots 95 of a pair of lugs 96 of arms 87. As usual, said roller is provided with a pair of tension springs 97, each end of shaft 94 being connected to one end of said springs while the other end is anchored to lugs 96. The feed roller 90 is mounted on a shaft 98 supported by suitable bearings of arms 87. Shaft 98 carries a gear 99 which is driven by means of a gear 100 pivoted to a stud 101 held by one of the webs 87. To the hub of gear 100 is secured a sprocket 102 which is driven through a chain 103 from a suitable sprocket mounted on shaft 104 (Fig. 2) supported by bearings in main frame 20. The guide roller 91 (Figs. 1 and 7) is mounted on a shaft 105 supported by bearings in webs 87. The triangular frame 92 (Figs. 1 and 7) over which the web of wrapping material is guided, is fastened at its widest portion to webs 87 and its apex is fastened to a tongue 106 of a tube forming mandrel 107 which is fastened along its longitudinal edges to the sides of a rail 108. The upper edge of the latter is used to guide a second conveyor chain 109 onto which the horizontal bottles B1 are delivered by the first conveyor 43 (Fig. 1). Chain 109 is similarly equipped with a number of properly spaced transporting lugs 110. In order to guide the horizontal bottle properly as it ascends the incline illustrated in Fig. 1, two guide chains 111, one traveling on each side of conveyor chain 109, are provided. Both guide chains 111 of course travel at the same speed as conveyor chain 109 and are equipped with guide lugs 112 which prevent the bottle from rolling. Conveyor chain 109 is guided under the forward end of the bottle by a suitable sprocket (not shown) loosely mounted on shaft 64. As mentioned heretofore said conveyor chain is guided over the edge of guide rail 108 onto a sprocket 113 (Fig. 2) mounted on shaft 104, thus providing driving means for the latter. Conveyor chain 109 furthermore is provided with a tightener sprocket 114 (Fig. 1) pivoted to an arm 115 adjustably attached to bracket 65. Guide chains 111 are driven by a pair of sprockets 116 (Fig. 2) mounted on shaft 117 supported by suitable bearings in main frame 20. Said guide chains 111 are led over two pairs of idler sprockets 118 and 119 and the upper portions are supported by a pair of guide rails 120 (Fig. 1) fastened by suitable clamps to a pair of supporting rods 121 held by main frame 20. Said rods 121 also support in a similar fashion the conveyor chain guide rail 108. Shaft 117 is driven through a sprocket 122 (Fig. 2) by a chain 123 engaging with a sprocket 124 mounted on shaft 104. Said chain 123 also drives a sprocket 125 mounted on a shaft 126 (Fig. 2) supported by a bearing lug 127 of main frame 20.

Figure 2:
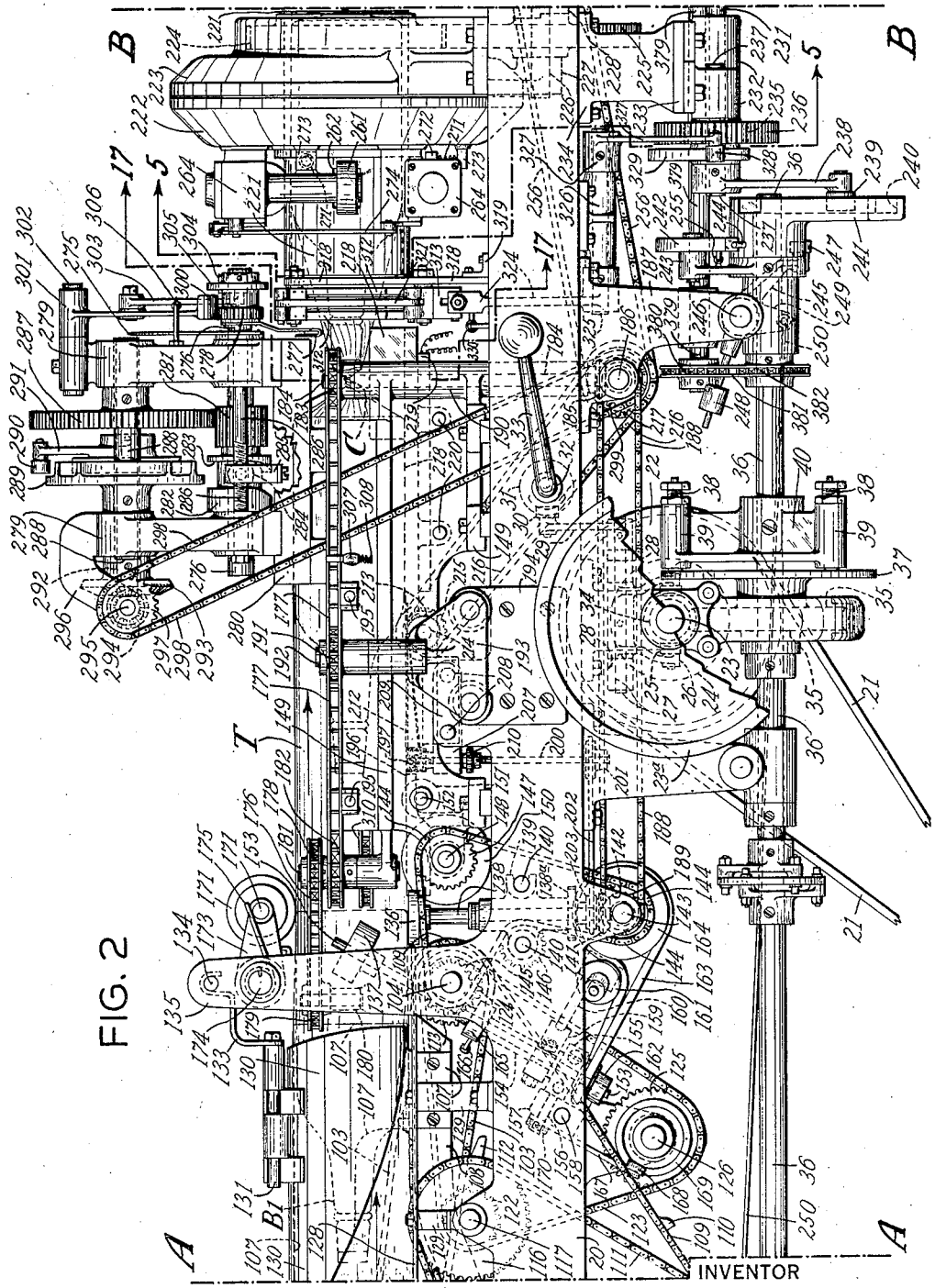
Figure 7:
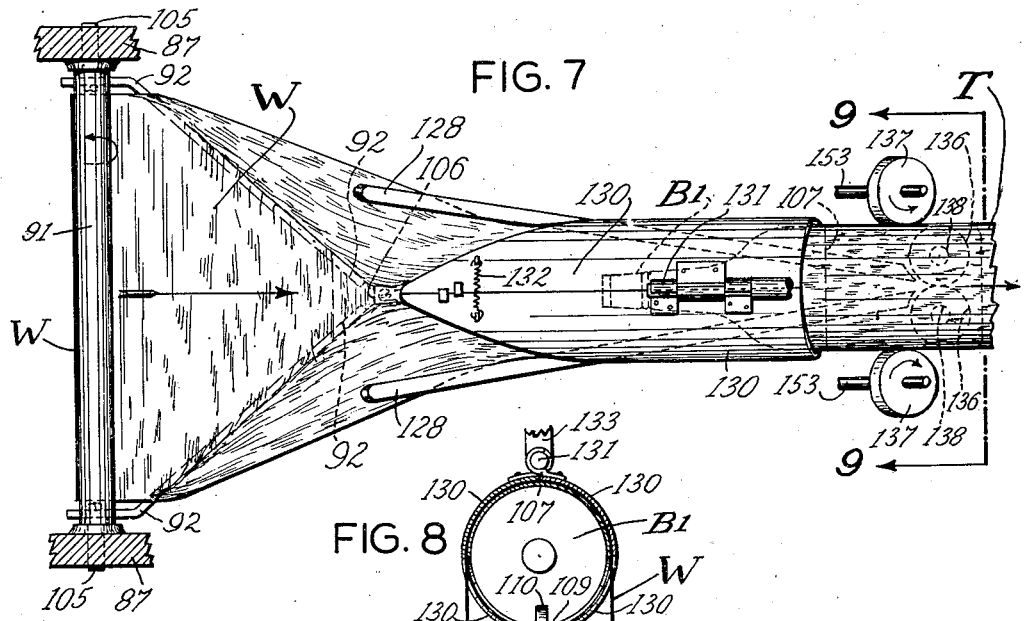
Fig. 7 is a partial plan view of the tube forming mechanism.
Figure 8:
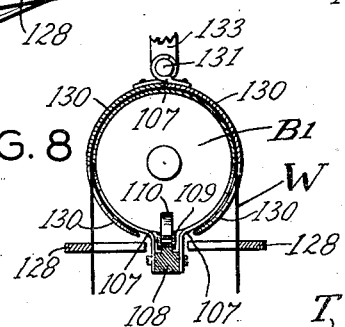

The web W, as mentioned heretofore, is guided over the triangular frame 92 and then onto the tube forming mandrel 107. As illustrated in Fig. 1, frame 92 is mounted in an inclined relation to the horizontal arbor 107. This arrangement is an important one, as the pre-forming action greatly facilitates the forming of a tube from a web and greatly reduces the distance necessary for such operation. A pair of side guide bars 128 (Figs. 1, 2 and 7), which guide the advancing web gradually onto said arbor, are also considered vital aids to this preforming operation. Guide bars 128 are mounted on a pair of suitable brackets 129 fastened to main frame 20. In order to assure that the paper lies smoothly over the mandrel 107, the latter is equipped with a tube forming shell 130 (Figs. 1, 2 and 7). Said shell 130 encloses the mandrel 107, and the wrapper web passes between said arbor and said shell, Fig. 8, whereby the web W is gradually draped into a tube T. The bottle B1 after it has been tilted to a horizontal position is conveyed by chain 109 through the center of mandrel 107 and is surrounded by the tube T of wrapping material when emerging from said mandrel (Figs. 2 and 7).

The tube forming shell 130 consists of two halves loosely resting on the tube forming mandrel 107. Said halves are detachably hinged to a stud 131 (Figs. 2, 7 and 8) and kept together by means of a light compression spring 132 (Figs. 1 and 7). Stud 131 is mounted on a supporting member 133 (Fig. 2) hooked to a rod 134 held by a pair of supporting arms 135 vertically projecting from main frame 20.

Figure 9:
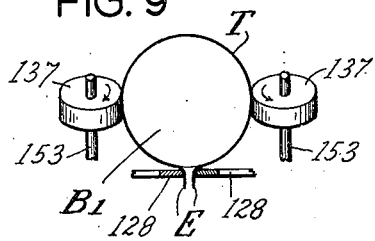
Figure 10:
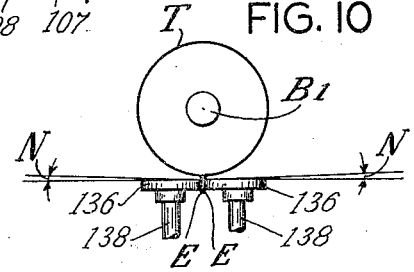

When the bottle emerges from the mandrel 107 it is enfolded by the tube T, the side edges E of the web W hanging down and forming flaps which are subsequently formed into a lock-seam (Fig. 9), although it is contemplated that a plain lap seam may be formed. Said flaps are gradually brought together by means of guide bars 128 and then enter between a pair of snubbing rollers 136 (Figs. 2, 7 and 10), whereupon said flaps are rolled tightly together. In order to fit the tube snugly around the bottle, said snubbing rollers 136 are mounted on a slight angle N, illustrated in Fig. 10, and correspondingly tapered upwardly to permit their peripheries to move into tangential relation to each other, thus causing a pulling action of said rollers upon the flaps of the tube and thereby achieving a tight fit of the tube over the bottle. Said snubbing rollers 136 are assisted in their pulling action by a pair of angularly mounted drag rollers 137 (Figs. 2, 7 and 9), contacting the tube T on each side of the bottle B1.

Each snubbing roller 136 is mounted on a vertical shaft 138 supported by a bearing in a bracket 139 held by a pair of rods 140 secured to main frame 20. Gears 138a on the lower portion of each shaft 138 (Fig. 2) mesh with each other, and on one of said shafts is mounted a bevel gear 141 meshing with a corresponding bevel gear 142 mounted on a horizontal shaft 143 supported by bearings in main frame 20. Shaft 143 is equipped with and driven by a suitable sprocket engaging with a chain 144 driven by a sprocket 145 mounted on shaft 104. Chain 144 furthermore runs over an idler sprocket 146 pivoted on one of the rods 140 and also drives a sprocket 147 mounted on a horizontal shaft 148 supported by suitable bearings in a guide frame 149 mounted on the main frame 20. To shaft 148 are secured a pair of guide disks 150 which, together with another pair of smaller disks 151, form the support for the bottle B1 after it leaves conveyor chain 109 and passes snubbing rollers 136. Disks 151 are loosely mounted on a shaft 152 also mounted in guide frame 149.

Each drag roller 137 is mounted on a shaft 153 supported by a sleeve bearing 154 attached to a lug 155 which, by means of a stud 156 is pivoted to a supporting lug 157 rigidly mounted on a rod 158 secured to main frame 20. To each sleeve bearing 154 is clamped a lug 159 having an arm 160 to which is pivoted an idler pulley 161. The lower portion of each of the shafts 153 carries a pulley 162 which is driven through a belt 163 by means of pulley 164 mounted on shaft 143. Each belt 163, of course, runs over its corresponding idler pulley 161, and thus both drag rollers 137 are driven in the direction indicated in Figs. 7 and 9. To the upper portion of each bearing sleeve is secured a collar 165 (Fig. 2), to each of which is anchored a tension spring 166 employed for the purpose of keeping rollers 137 in gripping contact with the tube T during the passage of the bottle B1. In order to avoid injury or crumpling of the tube T, said rollers are released from their contact with the latter as soon as the body of the bottle has passed the same by means of an arm 167 fastened to one of the studs 156. To said arm 167 is pivoted a roller 168 contacting a cam 169 mounted on shaft 126. In order to cause both rollers at the same time either to engage or disengage with the tube T, both studs 156 carry and are connected by a pair of intermeshing segment levers 170. To assure a good contact of the bottom or seam portion of the tube T with the snubbing rollers 136, a tension roller 171 (Fig. 2) of suitable material contacts the top portion of the tube T along the bottle B1. Said tension roller 171 is pivoted on a shaft 172 held by a forked arm 173 mounted on a shaft 174 supported by suitable bearings in the supporting arm 135 of the side frames. Forked arms 173, of course, are equipped with a torsion spring 175 (Fig. 2), which presses the arms 173 against lugs on the arms 135.

After emerging from the folding mandrel 107, the tube T and the bottle B1 are led through a short pair of guide chains 176 (Fig. 2) after passing which said tube and bottle are gripped and supported by a pair of conveyor chains 177. Each guide chain 176 is driven by a sprocket 178 and supported by an idler sprocket 179. The latter is pivoted on a lug 180 projecting from the arm 135 (Fig. 2). Each sprocket 178 is mounted on a vertical shaft 181 supported by a bearing lug on frame 149. To each shaft 181 is furthermore fastened a sprocket 182, each supporting its corresponding conveyor chain 177 which is driven by its respective sprocket 183. Each of the latter is mounted on a vertical shaft 184 on whose lower ends are mounted bevel gears 185 each meshing with corresponding bevel gears on horizontal shafts 186 each supported by a bearing bracket 187 attached to main frame 20. Shaft 186 carries a suitable sprocket (not shown) which, through a chain 188 is driven by a sprocket 189 mounted on shaft 143. Each vertical shaft 184 is supported by a bearing lug 190 on frame 149 and each conveyor chain 177 runs over an idler sprocket 191. The sprockets 191 are pivoted to studs 192 which are held by brackets 193, each of which is adjustably attached to brackets 194 which are adjustably mounted on main frame 20. Both conveyor chains 177 carry a number of correctly spaced gripper lugs 195 which, when contacting the body portion of the bottle, grip the tube and bottle firmly between them and convey the same while the flaps of the said tube pass through the various folding devices to close said flaps and provide said tube with a lock seam.

Figure 11:
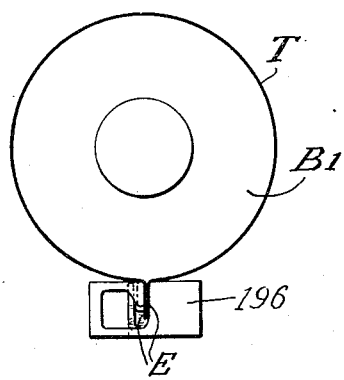
Figure 12:
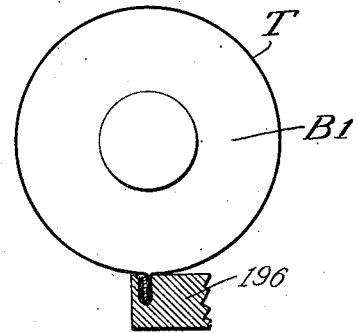

In order to fold said flaps into a lock seam, after leaving snubbing rollers 136, they pass through a folder 196 (Figs. 11 and 12) which folds said flaps over into a U-form, whereupon they enter a pair of crimping rollers 197 and 198 which crimp the U-formed flaps tightly together (Fig. 13). In order to avoid pinching or other injury to the tube, the latter is protected by a pair of thin guide plates 199 (Fig. 13) which allow only the flap of the tube to project into the crimping and folding mechanisms. The U-form folder 196 is supported by the frame 149 (Fig. 2). Crimper roller 197 (Fig. 13) is mounted on a vertical shaft 200 (Figs. 2 and 13), on its lower end carrying a pulley 201 (Fig. 2) which, through a belt 202 is driven by a pulley 203 secured to vertical shaft 138. Shaft 200 is supported by a bearing lug 204 (Fig. 13) held by a pair of rods 205 held by a suitable lug of main frame 20. Crimper roller 198 is mounted on a vertical shaft 206 supported by a bearing lug 207 slidably mounted on a pair of horizontal studs 208 secured to a suitable lug 209 (Figs. 2 and 13) on main frame 20. Both shafts 200 and 206 carry gears 210 meshing with each other. In order to assure good crimping action of rollers 197 and 198, a compression spring 211 (Fig. 13) is provided which acts upon bearing lug 207 thus causing roller 198 to roll firmly against roller 197.

After leaving crimper rollers 197 and 198 the crimped flap enters another folder plate 212 (Fig. 14) which folds it flat against the tube T (Fig. 15). To prevent opening of the flap and assure good adherence to the tube, the flap, after passing folder plate 212 is then again crimped by a crimper roller 213 (Fig. 16) against the tube, thus completing and providing a lock seam on the completed tube. Crimping roller 213 is secured to a horizontal shaft 214 supported by suitable bearings on frame 149. Shaft 214 also carries a sprocket 215 (Fig. 2) which is driven through a chain 216 by a sprocket 217 mounted on the horizontal shaft 186. In order to seal the finished lock seam of the tube, the tube with the enclosed bottle passes through a concave sealing unit 218 (Figs. 2 and 17) heated by suitable electrical heating units 219. Sealing unit 218 is mounted on a pair of rods 220 (Fig. 2) which are supported by the guide frame 149. After passing sealing unit 218 the sealed tube with the enclosed bottle enters a rotating guide sleeve 221 (Figs. 2, 5, 6 and 17) to which is rigidly mounted a twister head 222. Guide sleeve 221 is supported by a suitable bearing on a twister housing 223 (Fig. 6) mounted on main frame 20. To guide sleeve 221 is secured an annular gear 224 (Figs. 2, 5 and 6) meshing with a spur gear 225 (Figs. 2 and 5) loosely mounted on shaft 226 held by a bearing lug 227 on twister housing 223. Also loosely mounted on shaft 226, but coupled to the hub of gear 225 is a sprocket 228, Figs. 3 and 5, which through a chain 229 is driven by a sprocket 230 mounted on a shaft 231 supported by a bearing bracket 232 (Figs. 2 and 5) fastened to a supporting bar 233 attached to a pair of brackets 234 mounted on main frame 20. Shaft 231 also carries a pinion 235 (Fig. 5) meshing with a gear 236 (Figs. 2 and 5) secured to a shaft 237 similarly supported by bearing bracket 232.

On shaft 237 is furthermore mounted an arm 238 (Fig. 2) to which is pivoted a roller 239 engaging in a slot 240 of a Geneva arm 241 loosely mounted on the main shaft 36. Geneva arm 241 is driven by means of a bell crank control lever 242 (Fig. 2) which is pivoted on a crank 243 secured to the main drive shaft 36. During operation, one end of control lever 242 engages with a stud 244 in the hub of Geneva arm 241. The other end of said lever is free and projects rearwardly. Lever 242 is operated by means of a trip lever 245 pivoted on a shaft 246 supported by bearing bracket 187. To trip lever 245 is pivoted a roller 247 which projects into the path of the free end of control lever 242. Trip lever 245 is equipped with a counter-weight 248 and an operating lug 249. The latter, through a rod 250 (Figs. 1 and 2) is connected to an arm 251 (Fig. 1) pivoted on a stud 252 held by a bracket 253 attached to main frame 20. Arm 251 is equipped with a feeler finger 254 which projects into the path of the bottles B on the feed conveyor chain 43. Each time a bottle B passes over finger 254, the latter is pressed down by the same, thereby causing lever 245 with its roller 247 to swing out of the path of the free end of the control lever 242, and the latter, due to a tension spring 255, will remain in engagement with stud 244 of Geneva arm 241. When no bottle passes over finger 254, the trip lever, due to counter-weight 248, will remain in its upright position and roller 247 on trip lever 245 will project into the path of control lever 242 causes, at the termination of the cycle of the machine, the disengagement of the same from stud 244, thereby as described hereinafter, stopping all mechanisms connected with the bottle wrapping process, thus preventing jamming the machine as well as a waste of paper.

Figure 3:
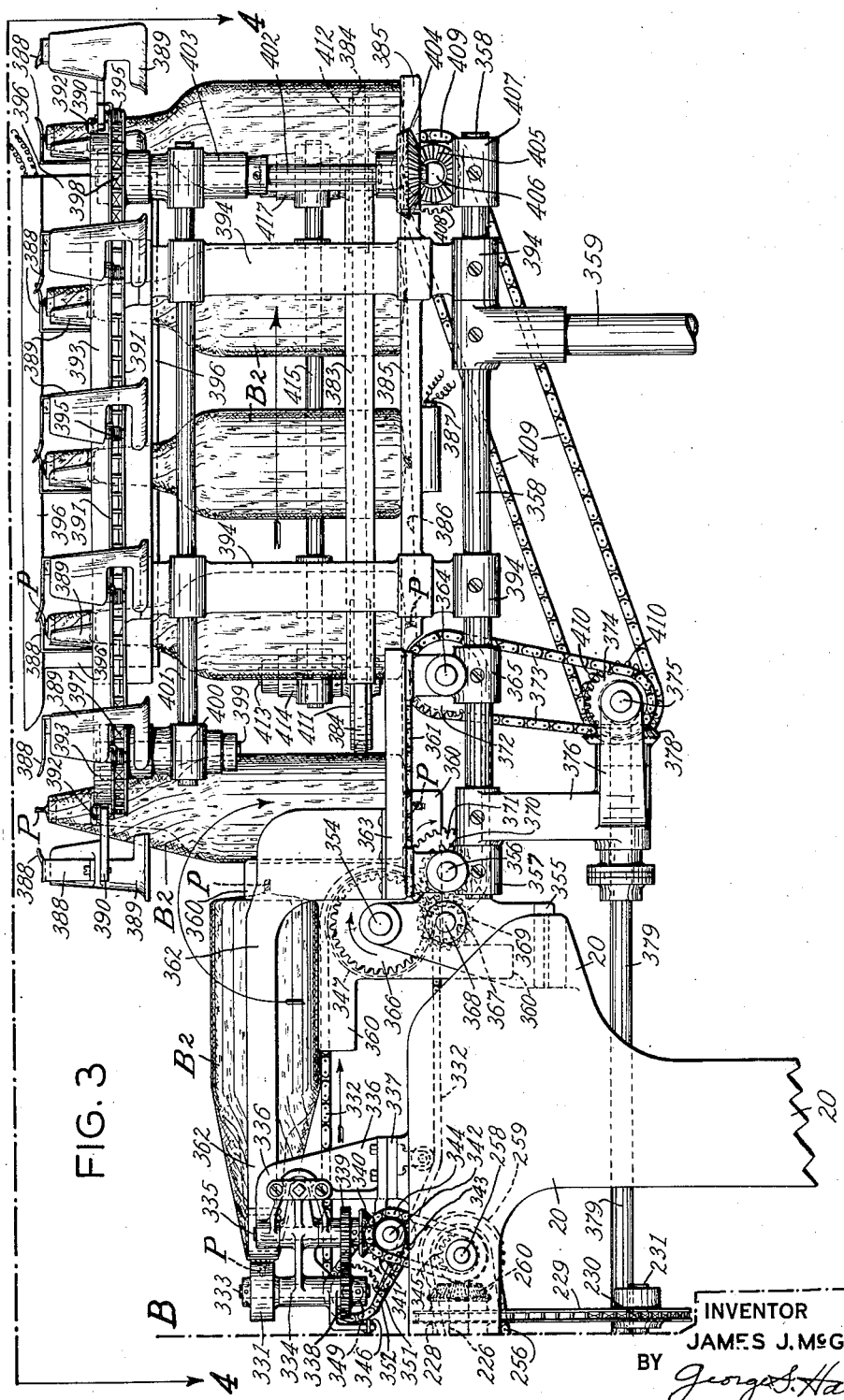

The bottle feed as well as the delivery mechanism, both being directly connected to continuously driven main shaft 36, will continue to operate and all wrapping process mechanisms will start again as soon as a bottle B depresses finger 254 and thus swings roller 247 on trip lever 245 out of the path of lever 242 and the latter can again engage with stud 244 and actuate Geneva arm 241. All mechanisms, including the paper feed as well as the bottle ejecting mechanism, taking part in the bottle wrapping processes, are controlled by the action of the Geneva arm 241, and the entire central portion of the machine (Fig. 2) is driven by shaft 186 which through a chain 256 is actuated by a sprocket 257 (Figs. 4 and 5) secured on shaft 258 (Figs. 3 and 4). The latter is equipped with a bevel gear 259 meshing with a bevel gear 260 mounted on the sprocket 228 of shaft 226 which, as described heretofore, drives the twister head and is actuated from the shaft 237 which is driven by the Geneva arm 241.

On their way through the guide sleeve 221 of twister head 222 the enclosed bottles are gripped and conveyed by a number of tangentially arranged rollers 261 (Figs. 2 and 5) protruding through suitable slots 262 in sleeve 221. Each roller is mounted on a shaft 263 (Fig. 5) supported by a housing 264 pivoted by an integral sleeve 265 thereon, Fig. 6, to the twister head 222. Within each of said sleeves 265 is supported a shaft 266, the projecting end of which carries a gear 267 (Figs. 5 and 6) while the end protruding into housing 264 carries a worm 268 (Fig. 5). The latter engages with a worm wheel 269 mounted on shaft 263. All gears 267 engage with an internal gear 270 (Figs. 5 and 6) secured to twister housing 223. Due to the stationary mounting of said internal gear, the latter causes, during the rotation of twister head 22, all gears 267 to rotate and thereby drive all rollers 261 in the direction of travel of the web. In order to assure good gripping action of the latter upon the enclosed bottle, each housing 264 receives tension from a compression spring 271, each of which is located between a lug 272 on each housing and a lug 273 projecting from twister head 22, the inward movement thereof being limited by suitable abutments on the twister head to prevent engagement with the neck of the bottle. To assure a uniform grip of all rollers 261, all four housings 264 supporting said rollers are connected by means of links 274.

The twisting action upon the tube T, surrounding the bottle B, takes place as soon as said bottle, after entering guide sleeve 221, contacts rollers 261. The portion of the tube between the mouth of the rotating bottle in the twister head and the bottom of the following bottle, still held by the conveyor chain 177, is twisted to a cord C (Fig. 2) thus tightly closing the tube between said bottles. Upon further advancement of the latter, said cord is cut by a suitable saw-knife blade 275 (Figs. 2 and 20) mounted on an intermittently rotating shaft 276. The latter rotates and also receives reciprocating motion parallel to the bottles, the speed of the forward motion equalling the speed with which the bottles are conveyed. When the knife blade 275, which revolves in a counter-clockwise direction as indicated by the arrow in Fig. 20, reaches the cord, the former is opposed by an oscillating ledger plate 277 which turns clockwise to the dotted position shown in Fig. 20 and co-acts with said knife blade, which is then traveling through the dotted position indicated in Fig. 20, during the entire cutting period. Ledger plate 277 is mounted on the hub of a gear 278 loosely mounted on shaft 276 and participates in the axial oscillating motion of the same, thus synchronizing the forward motion of the knife and ledger plate. Shaft 276 is supported by a pair of bearing brackets 279, 279a mounted on supporting bars 280 which are supported on the upper ends of angle bars 280a fastened to frame 149. To shaft 276 is secured a gear 281 and a cam 282 having a track 283 engaging with a roller 284 pivoted on a yoke consisting of bars 285 and 285a connected by a strap 285b adjustably mounted on a pair of stationary rods 286 and 286a held by brackets 279 and 279a, the rod 286 being threaded into the bar 285, whereby upon turning the same the shaft 276 will be adjusted axially. Shaft 276 is intermittently rotated by a gear 287 meshing with gear 281. Gear 287 is mounted on a shaft 288 supported by bracket 279 and 279a and carrying a Geneva wheel 289 operated by means of a roller 290 pivoted to an arm 291 mounted on a shaft 292 supported by brackets 279 and 279a. Shaft 292 carries a bevel gear 293 meshing with a bevel gear 294 secured to a shaft 295 supported by bearing lug 296 on bracket 279a. To shaft 295 is furthermore secured a sprocket 297 which, through a chain 298 is driven by a sprocket 299 mounted on shaft 186. The ledger plate is oscillated by gear 278 meshing with a gear segment 300 on an arm 301 pivoted on a stud 302 held by a lug on bracket 279. Arm 301 is actuated by a cam lever 303 adjustably secured on the arm 301 to vary the timing of the operative movement of the cutter and ledger plate. Cam lever 303 carries a roller 304 which engages with a cam 305 mounted on the knife shaft 276. To assure a continuous contact of roller 304 on cam 305 a tension spring 306 is connected to lever 303.

As mentioned heretofore, the enclosed bottle is conveyed into rotating guide sleeve 221 of twister head 222 by means of gripper lugs 195 on chains 177, and in order to prevent said bottle from turning before contacting rollers 261, it is necessary to keep the bottle gripped until the moment said rollers are contacting said bottle. Therefore to assure quick release of the bottle at the moment of contact with rollers 261, the front chain 177 carries a number of correctly spaced gripper balls 307 (Figs. 2 and 16) slidably mounted and rotatable on vertical pins 308 held by chain 177. In order to prevent the gripper balls 307 on chain 177 from sliding downward on pins 308, a light compression spring 309 (Fig. 16) is provided. The gripper balls holding the rear side of the bottle are supported by an additional chain 310 which is of the same type and character as rear chain 177, but without gripper lugs 195. The latter are exclusively mounted on the front and rear chain 177. Chain 310 is driven by suitable sprockets in the same manner and from the same shaft as the rear conveyor chain 177. The gripper balls 307 are so arranged as to hold the bottle after lugs 195 have separated and released their grip. As soon as the bottle contacts rollers 261 said bottle will turn in a clockwise direction and the gripper balls on the front chain 177 will be moved downward on their respective pins 308 and the balls on chain 310 are pushed upward, thus automatically releasing the grip on the bottle and tube and preventing injury or tearing of the latter.

In order to lay the twisted wrapping material covering the neck of the bottle, smoothly onto said neck, it is necessary to preform said neck portion and take the stiffness out of the twisted Cellophane. This action is performed during the twisting operation by a number of preforming jaws 311 (Fig. 17) gradually closing in and sliding along the neck portion of the bottle as the latter moves through the guide sleeve 221. Jaws 311 are secured to spring leaves 312, each of which is mounted on bell cranks 313, 314, 315 and 316, respectively. Said bell cranks are pivoted to studs 317 held by a frame plate 318 vertically mounted in front of guide sleeve 221 on a bar 319 secured to main frame 20. Frame plate 318 is provided with an opening 320 (Fig. 17) which is slightly larger than the inside diameter of guide sleeve 221. Bellcranks 313 and 315 are connected by a link 321, and bell cranks 314 and 316 are connected by a link 322. Members 313 and 314 are connected to a horizontal operating bar 323 to one end of which is adjustably connected an operating arm 324 (Figs. 2 and 17) mounted on a shaft 325 (Fig. 2) supported by a bearing bracket 326 attached to main frame 20. Shaft 325 is operated by a cam lever 327 carrying a roller 328 engaging with a cam 329 mounted on shaft 237. In order to keep roller 328 in contact with cam 329, a tension spring 330, fastened to arm 324 and anchored to main frame 20, is provided. Through cam 329 and lever 327 the preforming jaws 311 are moved in unison towards or away from the neck portion of the bottle at the proper time.

Upon leaving the guide sleeve 221, the completely wrapped bottle B2 (Figs. 3 and 4) contacts a pair of continuously rotating conveyor rollers 331 which delivers the same upon a conveyor or ejector chain 332. Each conveyor roller 331 is mounted on a vertical shaft 333 supported by bearing arms 334 pivoted to vertical shafts 335 supported by bearing brackets 336 fastened on a supporting bar 337 held by main frame 20. On their lower end each shaft 333 carries a gear 338 each of which is in mesh with a gear 339 mounted on each of the vertical shafts 335 respectively. To each gear 339 is attached a bevel gear 340 (Fig. 3) each of which is in mesh with a bevel gear 341 both of which are mounted on a horizontal shaft 342 driven through a sprocket 343 and a chain 344 by a sprocket 345 mounted on shaft 258. In order to assure good gripping action of rollers 331, bearing arms 334 are connected by means of a tension spring 346 (Figs. 3 and 4). Conveyor and ejector chain 332 is supported at its delivery end by a suitable disk 347 and driven by a sprocket 348 (Fig. 4) mounted on a shaft 349 held by a bracket 350 (Fig. 4) supported by bar 337. Shaft 349 is driven through a sprocket 351 and a chain 352 by a sprocket 353 mounted on shaft 342 (Fig. 3). Disk 347 supporting chain 332 is loosely mounted on a horizontal shaft 354 (Figs. 3 and 4) supported by bearings on a bracket 355 held by the main frame 20. In said bracket 355 is furthermore journalled a pair of horizontal shafts 356 each of which carries a lug 357 each of which is fastened to one end of a pair of rods 358 held by posts 359 (Fig. 3).

As illustrated in Figs. 3 and 4, chain 332 conveys the wrapped bottle B2 onto the rotating transfer cross 360 which delivers said bottle upright onto a pair of conveyor chains 361. During the transfer the bottle is taken from chain 332 in a horizontal position and delivered onto chains 361 in a vertical or upright position. During the transfer period, and while being conveyed on chain 332 the wrapped bottle is guided by means of a pair of guide rails 362 each of which is mounted on guide tables 363 which are equipped with suitable lugs supported by horizontal shafts 356 and 364. The latter is journalled in bearing lugs 365 attached to rods 358. The transfer cross 360 is mounted on shaft 354 carrying a gear 366 meshing with a gear 367 secured to a shaft 368 supported by bracket 355. Shaft 368 carries another gear 369 meshing with a gear 370 mounted on one of the shafts 356. The latter are driven through a pair of sprockets 371 and conveyor chains 361 by a pair of sprockets 372 driving said chain and secured to shaft 364. The latter is actuated through a suitable sprocket fastened thereon and driven by a chain 373 running over a sprocket 374 mounted on a shaft 375 supported by a bearing bracket 376 secured to supporting rods 358. Shaft 375 also carries a bevel gear 377 (Fig. 4) meshing with a bevel gear 378 secured to a shaft 379 supported by bracket 376. Shaft 379 is equipped with a sprocket 380 (Fig. 2) driven by a chain 381 from a sprocket 382 mounted on the main drive shaft 36.

As the wrapped bottle B2 is delivered in upright position onto chains 361, the twisted ends of the tube forming the wrapper have little ends or so-called pigtails P (Figs. 3 and 4) extending from the top and bottom of said wrapped bottle. It is desirable to have said pigtails, as well as that portion of the wrapping material covering the neck of the bottle, pressed smoothly onto the same. For this reason said bottle, by means of chains 361, is advanced in between a stationary side guide 383 and a continuously moving side guide belt 384, the action of the latter, besides advancing said bottle effecting an axial rotation of the same. During this movement, the pigtail P extending from the bottom of the wrapper engages with a groove 386 of gradually diminishing width and depth in a bottom guide plate 385, and during advancement of said pigtail in said groove it is gradually and smoothly pressed onto the bottom of said bottle. An electrical heating element 387 secured to bottom plate 385 assists in securing a perfect bottom seal. The pigtail P extending from the top of the wrapper engages with a folding finger 388 which during the axial rotation of the advancing bottle also causes a curling of said pigtail onto the top of said bottle. Each folding finger 388 is mounted on one of a series of arcuate ironing plates 389 which are secured to bell crank levers 390, all of which are pivoted at properly spaced intervals on a continuously moving chain 391. Each bell crank lever 390 is equipped with a roller 392 contacting a cam rail 393 held by a frame 394 supported by rods 358. Each bell crank lever 390 is provided with a torsion spring 395 (Fig. 3) assuring a continuous contact of rollers 392 with cam rail 393. Each wrapped bottle B2 when engaging with side guide 383 and guide belt 384 is met by one of the ironing plates 389 which stays in contact with the neck portion of said bottle until the latter is discharged from between said side guide 383 and guide belt 384. Due to the axial turning of the bottle the previously preformed neck portion of the wrapper is smoothly pressed onto the neck of the bottle. While being advanced by guide belt 384 said neck portion of the bottle furthermore contacts and wipes against a stationary heating plate 396 shaped to the contours of the neck of said bottle and employed for the purpose of more or less sealing the twisted wrapping material to avoid opening when the bottles are handled later on.

The heating plate 396 which is provided with suitable electrical heating elements, is held by frame 394. Chain 391 is supported by a sprocket 397 and driven by means of a sprocket 398. Sprocket 397 is mounted on a vertical shaft 399 held by a bearing lug 400 (Fig. 3) supported by a pair of horizontal rods 401 mounted on frame 394. Sprocket 398 is secured to a vertical shaft 402 held by a bearing lug 403 also attached to said rods 401. The lower end of shaft 402 carries a bevel gear 404 (Fig. 3) meshing with a bevel gear 405 secured to a horizontal shaft 406 supported by a suitable bearing bracket 407 held by supporting rods 358. Shaft 406 is driven through a sprocket 408 and a chain 409 by a sprocket 410 secured to shaft 375. Guide belt 384 is supported by a pulley 411 and driven by a pulley 412. Pulley 411 is secured to a shaft 413 supported by a bearing lug 414 mounted on a pair of horizontal supporting rods 415 held by frame 394. Pulley 412 is mounted on a vertical shaft 416 supported by a bearing lug 417 also attached to and held by rods 415. The lower portion of shaft 416 carries a bevel gear 418 (Fig. 4) meshing with a bevel gear 419 secured on shaft 406.

The invention above described may be varied in construction within the scope of the claims for the particular device selected to illustrate the invention is but one of many possible concrete embodiments of the same. The invention is not, therefore, to be restricted to the precise details of the structure shown and described. Moreover, if the tube of wrapping material is formed with a lap seam, the same may be sealed by suitable application of glue thereto.

If desired, instead of heat sealing the twisted end of the wrapper at the top of the bottles, it may be capped with flexible metal caps 450 as shown in Fig. 18. These caps may be provided with notches 451 providing prongs which may be clinched on the bottle by suitable mechanism not shown, thus preventing opening of the twisted end.

What is claimed is:

1. In a wrapping machine, the combination with means for continuously advancing a continuous web of wrapping material with a series of articles disposed in predetermined spaced relation, of devices for enfolding the articles in the web while the web is being advanced by said means, mechanism for twisting the portions of the web intermediate the enfolded articles while the web and said articles are being advanced by said means, and mechanism for severing the web intermediate the articles while said web is being continuously advanced by said means following said enfoldment and twisting.

2. In a wrapping machine, the combination with means for continuously advancing a continuous web of wrapping material with a series of articles disposed in predetermined spaced relation, of devices for enfolding the articles in the web while the web is being advanced by said means, mechanism for twisting the portions of the web intermediate the enfolded articles while the web and said articles are being advanced by said means, mechanism for severing the web intermediate the articles while said web is being continuously advanced by said means following said enfoldment and twisting, and mechanism for depositing articles on said web in said predetermined spaced relation thereon.

3. In a wrapping machine, the combination with means for continuously advancing a continuous web of wrapping material with a series of articles disposed in predetermined spaced relation, of devices for enfolding the articles in the web while the web is being advanced by said means, mechanism for twisting the portions of the web intermediate the enfolded articles, a device for severing the web intermediate the articles while said web is being continuously advanced following said enfoldment and twisting, mechanism for depositing articles on said web in said predetermined spaced relation thereon while the web is continuously advanced by said means, and a device for incapacitating said means upon failure of said mechanism to deposit an article upon said web.

4. In a wrapping machine, the combination with means for continuously advancing a continuous web of wrapping material with a series of articles disposed in predetermined spaced relation, of devices for enfolding the articles in the web and twisting the portions of the web intermediate the enfolded articles, and means for severing the web intermediate the articles while said web is being continuously advanced following said enfoldment and twisting, said devices including a mandrel over whose top the web is advanced, a shell for folding the margins of the web down over the sides of the mandrel into abutting relationship, members operating to intermittently press said margins together along the length of the articles enclosed within the web to draw the latter snugly about the articles.

5. In a wrapping machine, the combination with means for continuously advancing a continuous web or wrapping material with a series of articles disposed in predetermined spaced relation, of devices for enfolding the articles in the web and twisting the portions of the web intermediate the enfolded articles, and means for severing the web intermediate the articles while said web is being continuously advanced following said enfoldment and twisting, said devices including a knife traveling with the articles enfolded in the web and rotating in a path intersecting the latter intermediate the articles to sever the enfolded articles.

6. In a wrapping machine, the combination with means for supporting and advancing articles lengthwise in predetermined spaced relationship, of members for guiding a web of wrapping material above and along the path of and pressing the web against the articles to feed the web along with the same.

7. In a wrapping machine, the combination with means for supporting and advancing articles lengthwise in predetermined spaced relationship, of members for guiding a web of wrapping material above and along the path of and pressing the web against the articles to feed the web along with the same, and devices for folding the web into tubular cross-section about the girth of the articles and relatively rotating adjacent articles to twist the portions of the tube therebetween.

8. In a wrapping machine, the combination with means for supporting and advancing articles lengthwise in predetermined spaced relationship, of members for guiding a web of wrapping material above and along the path of and pressing the web against the articles to feed the web along with the same, devices for folding the web into tubular cross-section about the girth or the articles and relatively rotating adjacent articles to twist the portions of the tube therebetween, and a knife for severing the twisted portions of the web.

9. In a wrapping machine, the combination with devices for folding a continuous web about a series of articles having a predetermined spaced relationship, of yielding members for gripping the sides of articles enfolded in said web and advancing the same, and mechanism for gripping and rotating on its axis the foremost article delivered by said members.

10. In a bottle wrapping machine, the combination with devices for folding a continuous web of wrapping material in tubular form about a series of bottles having a predetermined spaced relationship, of mechanism for rotating the foremost bottle enfolded in said web and thereby twisting the tubular wrapping material between the foremost bottle and the next bottle, and members engaging the neck of the foremost bottle during its rotation to form the tubular wrapping material to the shape of the bottle neck.

11. In a bottle wrapping machine, the combination with devices for folding a continuous web of wrapping material in tubular form about a series of bottles having a predetermined spaced relationship, of mechanism for rotating the foremost bottle enfolded in said web and thereby twisting the tubular wrapping material between the foremost bottle and the next bottle, members engaging the neck of the foremost bottle during its rotation to form the tubular wrapping material to the shape of the bottle neck, and means for advancing bottles butt end foremost through said devices and into said mechanism.

12. In a wrapping machine, the combination with means for advancing a continuous web of wrapping material and folding the same about a series of articles disposed in predetermined spaced relation, of devices for twisting the portions of the web intermediate the enfolded articles, means for severing the web intermediate the articles following said enfoldment and twisting, and means for heat sealing the twisted ends of the severed packages.

13. In a wrapping machine, the combination with means for advancing a continuous web of wrapping material and folding the same about a series of articles disposed in predetermined spaced relation, of devices for twisting the portions of the web intermediate the enfolded articles, means for severing the web intermediate the articles following said enfoldment and twisting, and means for pressing the twisted ends of the severed packages against the article ends and heat sealing said twisted ends.

14. In a bottle wrapping machine, the combination with devices for folding a continuous web of wrapping material in tubular form about a series of bottles having a predetermined spaced relationship, of mechanism for rotating the foremost bottle enfolded in said web and thereby twisting the tubular wrapping material between the foremost bottle and the next bottle, members engaging the neck of the foremost bottle during its rotation to form the tubular wrapping material to the shape of the bottle neck, a knife for severing the foremost enfolded bottle following the twisting of the wrapping material, and mechanism for pressing and smoothing the twisted wrapping material on the neck of said bottle.

15. In a bottle wrapping machine, the combination with devices for folding heat sealable wrapping material into tubular form about a bottle and twisting the tubular wrapping material about the neck of the bottle, and means for pressing and smoothing the twisting wrapping material about the neck of the bottle to cause it to conform to the contour thereof and heat sealing the same.

16. In a wrapping machine, the combination with mechanism for advancing bottles horizontally and enfolding them in tubular wrapping material and twisting the tubular wrapping material about the necks of the horizontally advancing bottles, of means for advancing articles in upright position and upsetting the upright articles and delivering them in horizontal position to said mechanism.

17. In a wrapping machine, the combination with mechanism for advancing articles horizontally and enfolding them in wrapping material and twisting the material about the neck of the bottles, of devices for tilting the enfolded bottles to an upright position and pressing and smoothing the material on the neck of the bottles.

18. In a wrapping machine, the combination with means for continuously advancing a continuous web of wrapping material with a series of articles disposed in predetermined spaced relation of devices for folding the web of wrapping material into tubular formation about the girth of said articles, said devices including members intermittently engaging the margins of the tubular portion of the web along the length of successive articles and coacting to press said margins together, and thereby draw the web snugly about the girth of the articles, and means for withdrawing said members from the web margins during the passage of an unfilled portion of the web therebetween.

19. In a wrapping machine, the combination with means for continuously advancing a continuous web of wrapping material together with a series of articles disposed in predetermined spaced relation, of devices for folding the web of wrapping material into tubular formation about the girth of said articles and lapping and folding the margins of the web to form a continuous seam, while said web and said articles are continuously advanced by said means, and mechanism for twisting the portions of the tubular wrapping material intermediate the spaced articles along said seam while the web and said articles are continuously advanced by said means, said twisting mechanism including a rotary member provided with an opening arranged to admit the foremost article enfolded in said web, and instrumentalities rotatable with said member and operating to grip and advance the enfolded article located in the opening of said member and rotate said article relatively to the immediately adjoining enfolded article to twist the tubular portion of the web intermediate the foremost and the immediately adjoining article.

20. In a wrapping machine, the combination with means for continuously advancing a continuous web of wrapping material with a series of articles disposed in predetermined spaced relation, of devices for folding the web of wrapping material into tubular formation about the girth of said articles and lapping and folding the margins of the web to form a continuous lock seam, and means for crimping said lock seam, said devices acting to fold the lock seam flat against the tube of wrapping material, and a member for further crimping the seam after it has been folded down against said tube.

21. The process comprising folding a continuous web of wrapping material into tubular form about a series of continuously traveling articles having a neck and arranged in a predetermined spaced relationship, rotating the foremost article enfolded in said web by members engaging the same and having a component in the direction of movement of the articles and thereby twisting the tubular wrapping material between the foremost article and the next article, and severing the twisted wrapping material intermediate the foremost article and the next article.

22. The process comprising folding a continuous web of wrapping material into tubular form about a series of continuously traveling articles having a mouth and arranged in a predetermined spaced relationship, rotating the foremost article enfolded in said web and thereby twisting the tubular wrapping material between the foremost article and the next article, severing the twisted wrapping material intermediate the foremost article and the next article, and applying caps on the mouth of the article and clinching them thereon.

23. In a wrapping machine, the combination with means for continuously advancing a continuous web of wrapping material with a series of articles disposed in predetermined spaced relation, of devices for enfolding the articles in the web while the web is being advanced by said means, mechanism for twisting the portions of the web intermediate the enfolded articles while the web and said articles are being advanced by said means, and mechanism for severing the web intermediate the articles while said web is being continuously advanced by said means following said enfoldment and twisting, said twisting mechanism including a device for relatively rotating articles enfolded in said web to twist the portions of the web intermediate adjacent enfolded articles, and instrumentalities for advancing the articles rotated by said device.

24. In a wrapping machine, the combination with means for continuously advancing a continuous web of wrapping material with a series of articles disposed in predetermined spaced relation, of devices for enfolding the articles in the web while the web is being advanced by said means, mechanism for twisting the portions of the web intermediate the enfolded articles while the web and said articles are being advanced by said means, and mechanism for severing the web intermediate the articles while said web is being continuously advanced by said means following said enfoldment and twisting, said twisting mechanism including a hollow rotary member provided with an opening arranged to admit an article enfolded in said web, and instrumentalities rotatable with said member and operating to grip and advance the enfolded article located in the opening of said member and rotate said article relatively to the following enfolded article to twist the tubular portion of the web intermediate said articles.

JAMES J. McGINLEY.